United States Patent [19]

Smetters et al.

[11] Patent Number: 5,769,429

[45] Date of Patent: Jun. 23, 1998

[54] SEAT FOR AIR VALVES

[75] Inventors: Robert W. Smetters; Ted J. Makowan, both of Schaumburg, Ill.

[73] Assignee: Val-Matic Valve and Manufacturing Corp., Elmhurst, Ill.

[21] Appl. No.: 724,086

[22] Filed: Sep. 30, 1996

Related U.S. Application Data

[63] Continuation of Ser. No. 492,931, Jun. 21, 1995, abandoned.

[51] Int. Cl.⁶ .............................. F16J 15/10; F16J 15/32
[52] U.S. Cl. ..................... 277/549; 277/644; 277/910; 137/202
[58] Field of Search ........................... 277/166, 207 R, 277/211, 214, 215; 251/334, 364, 361; 137/202, 433

[56] References Cited

U.S. PATENT DOCUMENTS

| | | | |
|---|---|---|---|
| 924,641 | 6/1909 | Crispin | 137/202 |
| 1,083,350 | 1/1914 | Davis | 277/207 |
| 1,969,795 | 8/1934 | Hewitt | 277/207 |
| 2,383,570 | 8/1945 | Sellew | 277/211 |
| 2,610,870 | 9/1952 | Parmesan | 277/211 |
| 2,725,071 | 11/1955 | McKillop | 137/202 |
| 3,152,604 | 10/1964 | Frye et al. | 137/202 |
| 3,727,635 | 4/1973 | Todd | 137/513.5 |
| 3,770,001 | 11/1973 | Davis | 137/202 |
| 4,079,751 | 3/1978 | Partridge et al. | 251/364 |
| 4,104,004 | 8/1978 | Graef | 137/202 |
| 4,519,614 | 5/1985 | Garner | 277/166 |
| 4,934,715 | 6/1990 | Johnson | 277/207 R |
| 5,322,330 | 6/1994 | Remsburg | 277/206 R |

FOREIGN PATENT DOCUMENTS

| | | | |
|---|---|---|---|
| 557334 | 3/1960 | Belgium | 277/211 |
| 1105990 | 12/1955 | France | 277/166 |
| 814977 | 8/1951 | Germany | 277/211 |
| 1270471 | 11/1986 | U.S.S.R. | 277/166 |

OTHER PUBLICATIONS

Val-Matic, "Swing-Flex® Check Valve", Bulletin 500, Jan. 15, 1994.
Val-Matic, "Combination Air Valves", Bulletin No. 200, Revised Aug. 1, 1989.
Val-Matic, "Air and Vacuum Valves", Bulletin No. 100, Revised Aug. 1, 1989.
Val-Matic, Air and Vaccum Valves, Drwg. No. VM-100, Revised Feb. 1, 1985.
Val-Matic, Air and Vacuum Valve, Drwg. No. VM-104, Revised Jul. 18, 1989.
Val-Matic, Combination Air Release, Air & Vacuum Valve, Drwg. No. VM-201C, Revised Aug. 15, 1990.

Primary Examiner—William A. Cuchlinski, Jr.
Assistant Examiner—John L. Beres
Attorney, Agent, or Firm—Hill & Simpson

[57] ABSTRACT

An improved seat for air valves and combination air release and air valves is provided. The improved seal for an air valve has a resilient member with a top surface and a bottom surface and a through hole therebetween; a circular raised bead positioned on the top surface having a diameter larger than that of the through hole and a circumferential slot arranged in the through hole; and having a diameter larger than that of the through hole so that a lip is formed between the bottom surface and the circumferential slot. In addition, a seal for an air valve having a resilient member with a top surface and a bottom surface and a through hole therebetween; a circular raised bead positioned on the bottom surface, the circular raised bead having a diameter larger than that of the through hole; and a notch circumscribing the through hole and having a diameter larger than that of the through hole so that contact surface is formed between the notch and the through holes is also provided. The seal is preferably a hard elastomer of up to approximately 90 durometer.

17 Claims, 5 Drawing Sheets

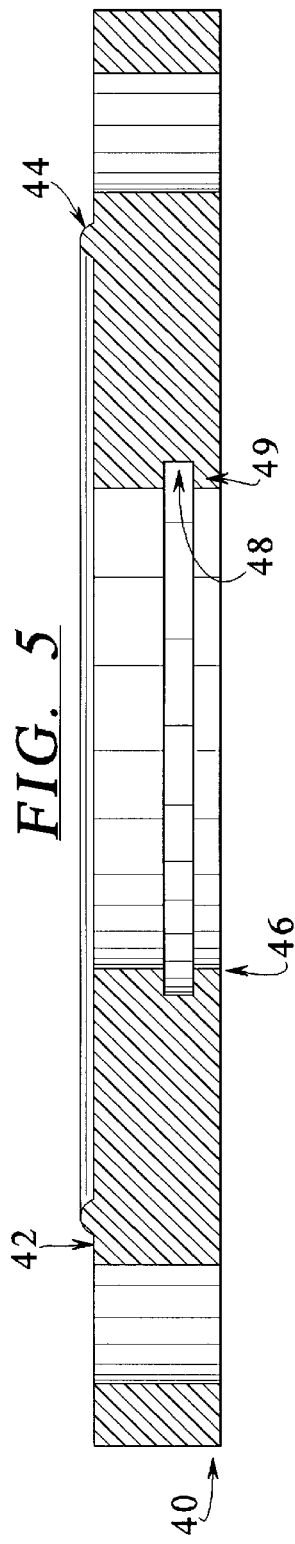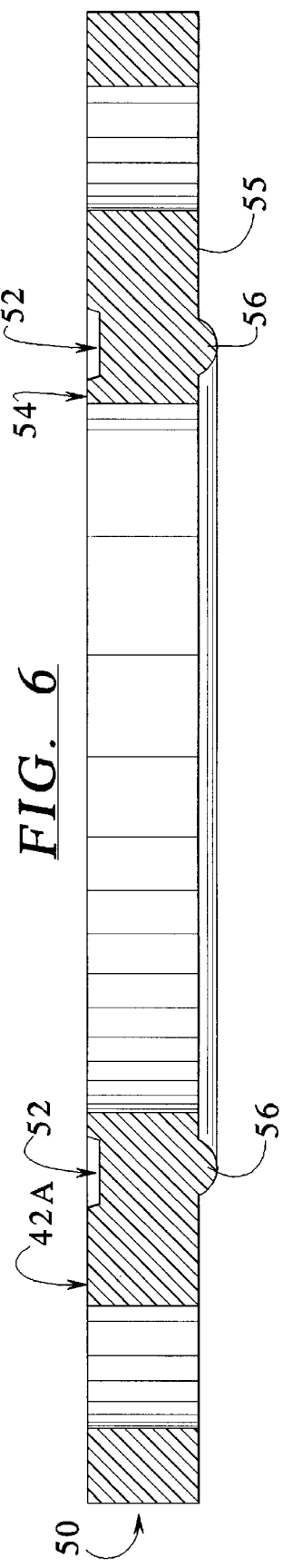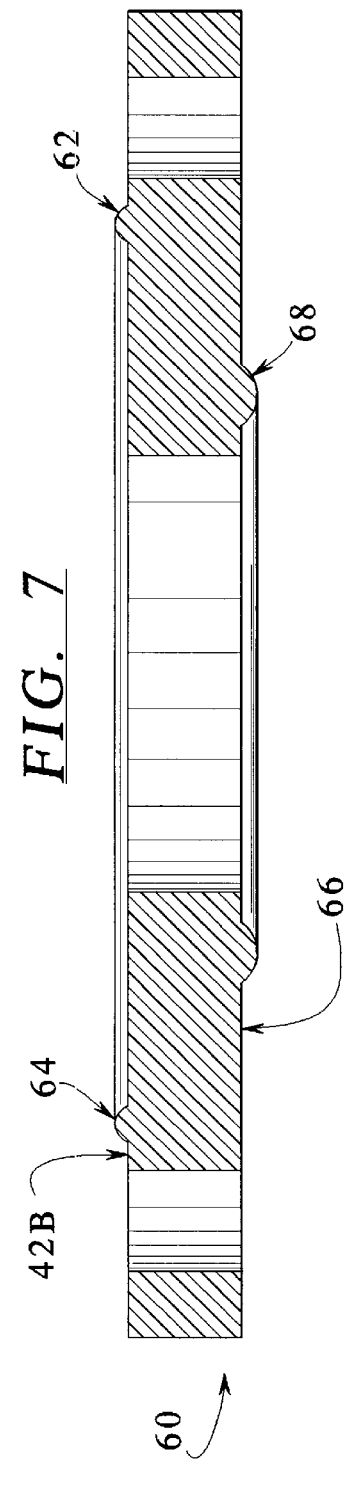

SEAT FOR AIR VALVES

This continuation, of application Ser. No. 08/492,931, filed Jun. 21, 1995 now abandon.

BACKGROUND OF THE INVENTION

1. Field of the Invention

The present invention relates to valves used to vent and admit air into pipelines or tanks to prevent adverse pressure and vacuum conditions. The improved seat of the present invention increases the ability to seal fluids at both low and high pressures while providing increased resistance to damage at high pressures.

2. Description of the Related Art

One function of an air/vacuum valve is to vent air from a pipeline during filling. When the line is full, the water in the valve raises the float against the seat thereby sealing tight to prevent the liquid from escaping. During pipe drainage or a line break, the valve will open and admit air into the line to prevent the formation of a potentially damaging vacuum. An air release valve is used to continually vent small amounts of air which accumulate at the high points in a piping system. For economy, a combination air valve is sometimes used to combine the functions of the air/vacuum and the air release valves.

Because air valves are installed in many types of service and for a variety of applications, they must be capable of sealing at both low (less than 10 psig) and high (greater than 150 psig) pressures and also be resistant to high pressure surges.

Many types of valves are available today. For example, the assignee of the present invention, Val-Matic® Valve and Manufacturing Corp., manufactures a number of different model valves. Some of these valves include:

Air/Vacuum Valve with Round Float: Dwg. VM-100 (½"–3")

Air/Vacuum Valve with Flat Float: Dwg. VM–104 (4" & Larger)

Combination Air Valve with Plug: Dwg. VM-201C

These types of valves are also manufactured in similar configurations by several other U.S. manufacturers such a APCO Valve & Primer, G.A. Industries, and Crispin Valve. The three valve types mentioned have distinct sealing actions described below with reference to FIGS. 1–3 wherein like numerals represent like parts.

FIG. 1 illustrates a prior art valve generally at 1.

The relatively small size valve 1 shown in FIG. 1 is a Val-Matic® valve model VM-100 and has an economical spherical float 2 with a seat 3 retained by a baffle 22 which guides the float 2 and helps seal the seat 3 at low pressures. The elastomer seat 3 must seal tight against both the valve cover 5 and the float 2 at low and high pressures. To seal at low pressures, most manufacturers find it necessary to use a soft elastomer (as low as 35 durometer) for the seat 3 so that intimate contact is achieved between the cover 5, seat 3, and float 2. The disadvantage of this solution is that at high pressures, the greater forces exerted between the cover 5 and the float 2 can permanently extrude and cut the seat 3 rendering the valve 1 inoperable. Experience has also shown that during pressure surges, float forces can similarly damage soft durometer seats.

FIG. 2 illustrates another prior art type of valve. A flat float valve 6 illustrated is a Val-Matic® air and vacuum valve model VM-104. This type of valve takes into account that the seating forces in air/vacuum valves are proportional to the square of the valve diameter. The seating forces are therefore of higher significance in larger size valves. Because of the greater float forces, a larger seat surface area is required. To this end, the top of the float 2 has a flat surface 7 to distribute the seating forces over a greater area of the seat 3.

In addition, FIG. 3 shows a prior art combination air valve 8. A Val-Matic® model VM-201C valve is shown having a flat plug 9 in addition to a float 2 to effect a seal. The plug 9 serves a dual purpose in sealing against both the air/vacuum seat 3 and the air release seat 11. The plug 9 must seal at both high and low pressures, but additionally, the deflection of the seat 3 must be minimal so that the orifice portion of the plug does not become disengaged from the air release seat 11 or leakage will occur. In the design of such combination valves, a delicate balance must be maintained between limiting the movement of the plug during high pressure sealing by the use of high durometer seats on one hand, and maintaining a tight seal at low pressures with a low durometer seat on the other. Manufacturers can offer valves with varying seat hardnesses for various pressures, but doing so results in higher cost and requires greater inventory.

SUMMARY OF THE INVENTION

The improved seat of the present invention provides raised surfaces and sections that greatly enhance the sealing action so that hard elastomers (as high as 90 durometer) can be used to reduce the potential for seat damage or leakage at high pressures. Experience has also shown that at low pressures, leaks can occur between the seat and the cover unless the mating parts are precision machined at a high cost. By providing raised portions on the seat surface that mate with the cover, the present invention provides increased sealing capability at that location as well.

The elastomer seats are typically mass produced using a molding process. The seat improvements of the present invention are easily included in the geometry of the molds, and therefore, provide a significant improvement in the performance of the valve at a minimal cost. By widening the pressure range of the seat, the use of multiple durometer seats can be eliminated, thereby lowering manufacturing costs and reducing inventory.

The invention shall be set forth in greater detail below with reference to the drawings.

BRIEF DESCRIPTION OF THE DRAWINGS

FIG. 5 is a cross-sectional view of a portion of an air and vacuum valve in enlarged detail having the embodiment of the improved seat for an air valve of FIG. 4 of the present invention.

FIG. 6 is a cross-sectional view of a portion of an air and vacuum valve having another embodiment of an improved seat for an air valve of the present invention.

FIG. 7 is a cross-sectional view of a portion of a combination air release, air and vacuum valve having another embodiment of an improved seat for an air valve of the present invention.

DETAILED DESCRIPTION OF THE PREFERRED EMBODIMENTS

Three embodiments of an improved seat of the present invention are illustrated in FIGS. 4–7. FIG. 5 shows the addition of a bead to an upper surface of the seat and a groove in an inner diameter of the seat for use with small valves. FIG. 6 depicts a seat with a bead on its lower surface and a slot on its upper surface for relatively larger valves. FIG. 7 shows beads on both sides of the seat to seal against the cover and plug at low pressures. The varying functions of the seat surfaces dictate the specifics of the three exemplary embodiments as follows.

Figure 4:
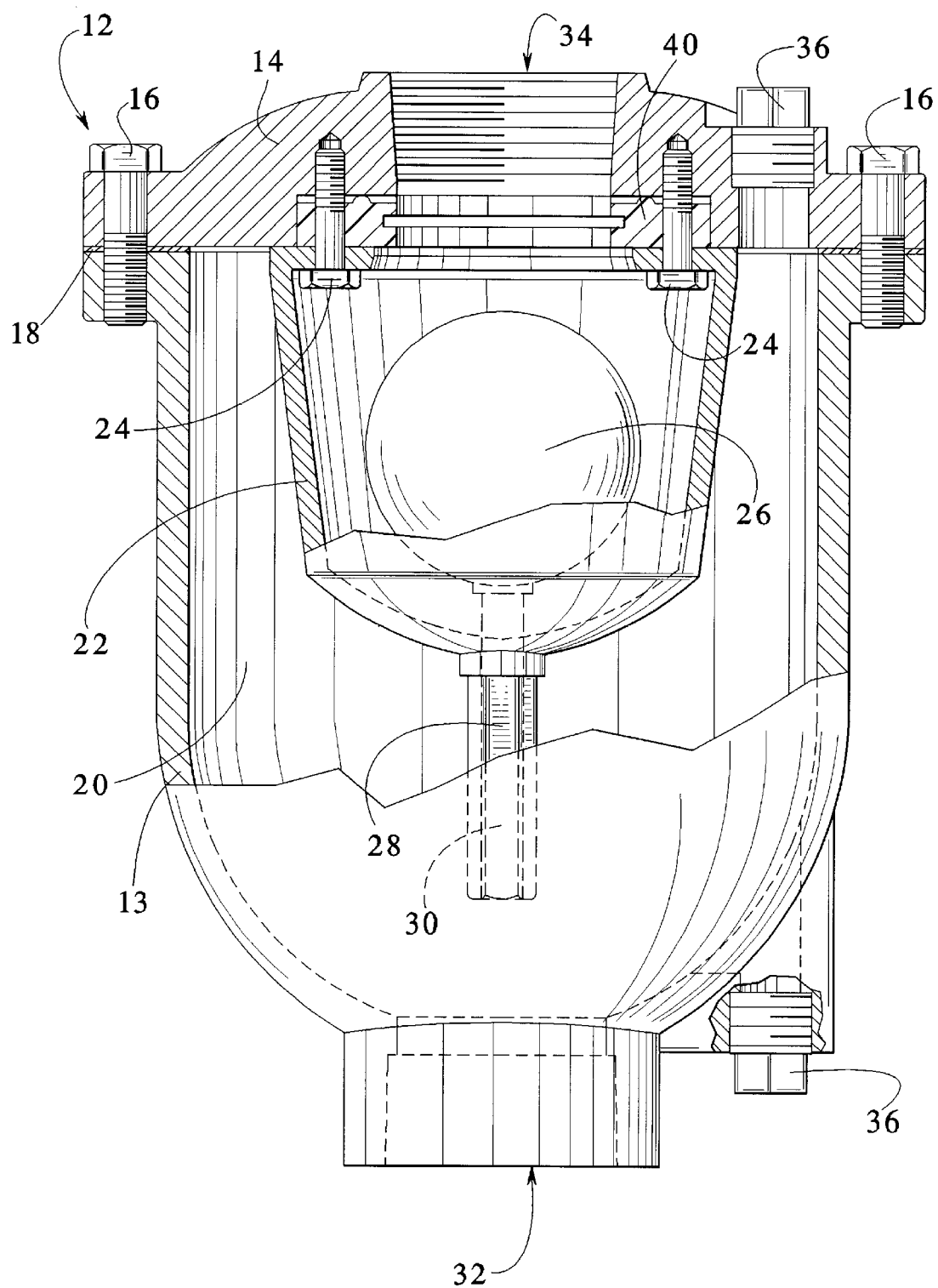
FIG. 4 is a cut-away elevation view, partially in cross-sectional detail, of an air and vacuum valve having an embodiment of an improved seat of the present invention.

Referring first to FIG. 4, an embodiment of an improved seat for an air and vacuum valve of the present invention is illustrated. A general description of the valve follows. A valve 12 includes a body 13 and a cover 14 secured to the body 13 by cover bolts 16. In addition, a gasket 18 is provided between the body 13 and the cover 14 for proper sealing. The body 13 also has an interior 20 which houses the baffle 22. The baffle 22 is connected via baffle screws 24 or other similar connectors to the cover 14. Inside the baffle 22 is a float 26. The float 26 is connected to a guide shaft 28 which travels in a guide bushing 30. The valve 12 has an inlet port 32 and an outlet port 34. In addition, pipe plugs 36 are provided. One pipe plug 36 is located in the body 13 and another pipe plug 36 is located in the cover 14. An improved seat 40 is illustrated near the outlet port 34. The seat 40 is located between the baffle 22 and the cover 14. An enlarged detail of the seat 40 is illustrated in FIG. 5 and described below.

As shown in FIG. 5, the improved seat 40 has a cover sealing surface 42. The cover sealing surface 42 has been enhanced with the addition of a bead 44 of elastomeric material. The elastomeric material may be buna N, a synthetic elastomer, however, one skilled in the art will appreciate that the improved seat 40 of the present invention may be manufactured from a number of materials having appropriate physical properties. The bead 44 has a low profile cross section, approximately 1/64" high, so as not to distort the inside diameter of the seat 40 when attached by the baffle 22. The raised surface formed by the bead 44 greatly magnifies the contact pressure between the elastomer seat 40 and the metal surface of the cover 14. This high contact pressure causes the elastomer seat 40 to fill in any irregularities in the metal surface of the cover 14 and provide a tight seal at pressures down to near zero.

The float 26 seals against a lower inner edge 46 of the seat 40. The surface of the float 26 is not a true sphere since the float 26 is usually made by a drawing or spinning process, and is not machined. Hence, at low pressures, there may be gaps between the edge 46 and the spherical float surface. By introducing a slot 48 above the edge 46, a resilient circumferential lip 49 is formed. The lip 49 is flexible enough to readily conform to the surface of the float 26 and thereby provide a tight seal at low pressures. The addition of the bead 44 and the slot 48 which forms the lip 49, enable the seat material to be molded in a high durometer material for high pressure applications or applications where pressure surges may occur.

Figure 1:
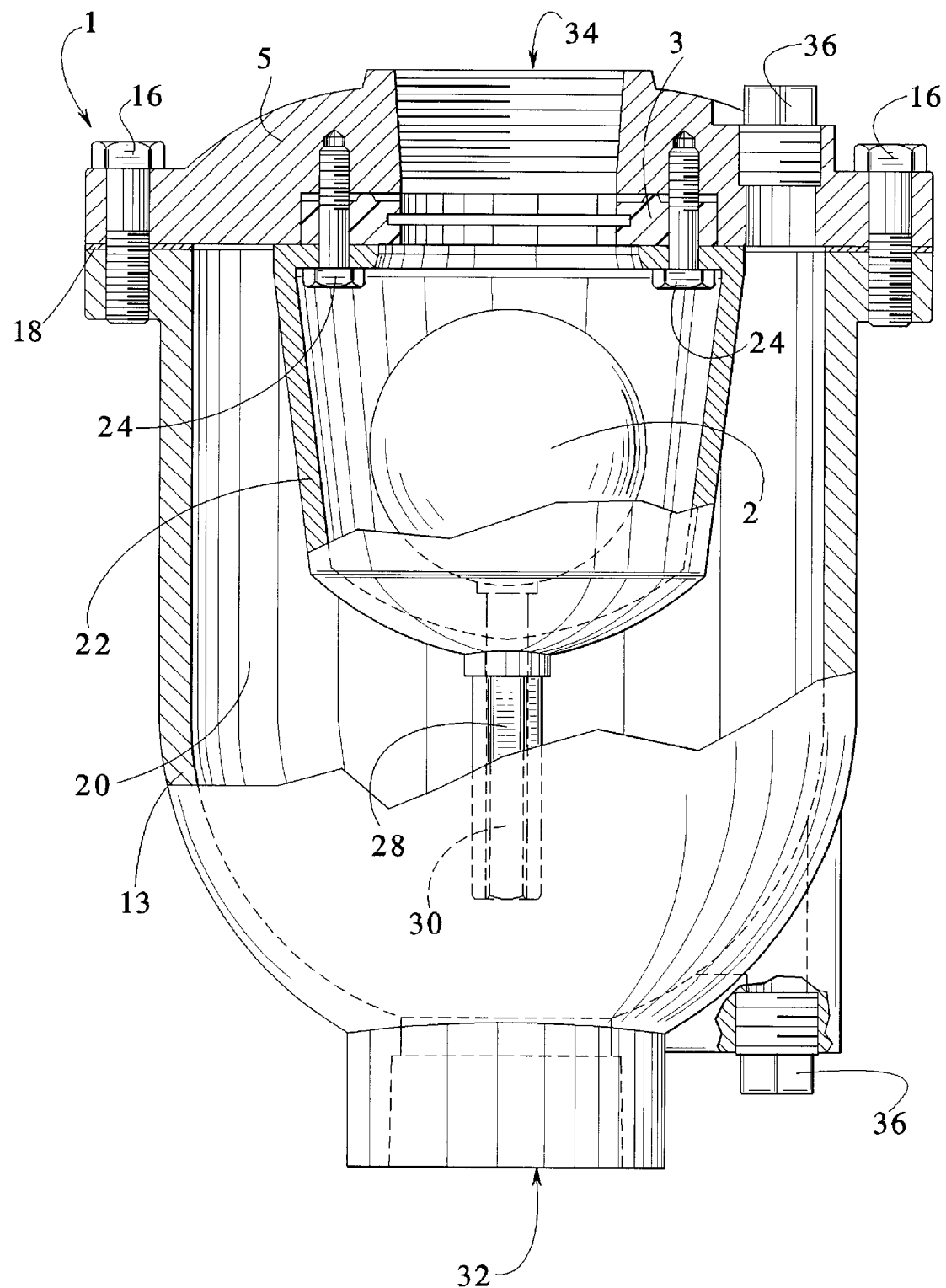
FIGS. 1–3 illustrate prior art valves.
Figure 2:
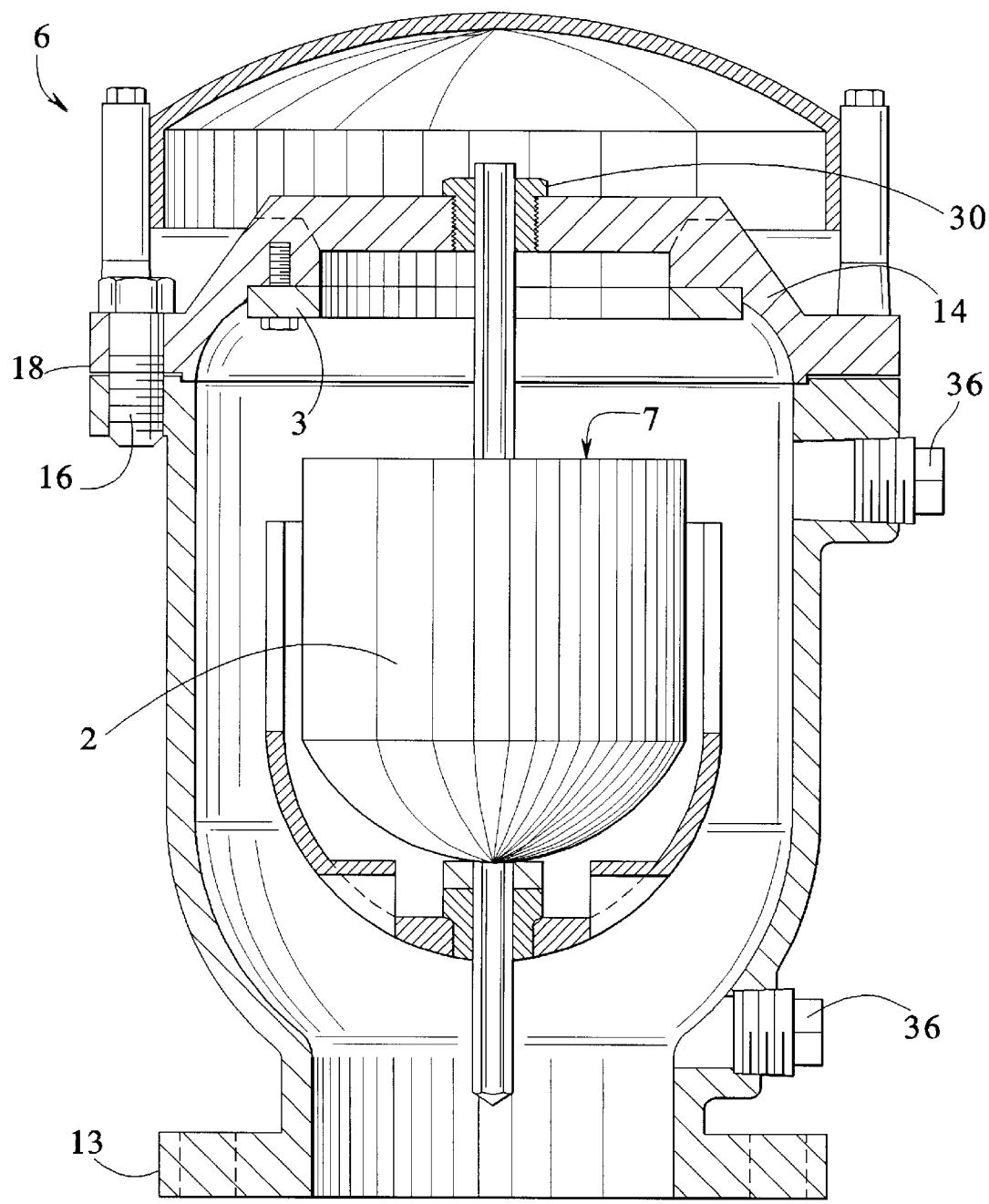

As shown in FIG. 6, another embodiment of an improved seat 50 is illustrated. This embodiment may be advantageously used with a larger diameter type air and vacuum valve as shown in FIG. 2 of the prior art. In this embodiment, the cover sealing surface 42A has been enhanced with the addition of a groove 52 in the elastomeric material. The groove 52 produces a narrow sealing surface 54 which magnifies the surface pressure between the seat 50 and the cover 14. This high contact pressure causes the elastomer to fill in any irregularities in the metal surface of the cover 14 and provides a seal at pressures down to near zero. The bead 44 located on the top cover sealing surface 42A shown in FIG. 5 cannot be used on relatively large valves because the seat 50 is not attached with the baffle 22 or ring so that any alteration of the cross section will cause the internal diameter of the seat 50 to deform when installed. The use of the groove 52 does not change the general envelope of the seat 50, thereby maintaining its dimensional stability when in service.

The top flat surface 7 of the float 2 (see FIG. 2) seals against a lower surface 55 of the seat 50. However, the float surface 7 is not a true flat plane because it is usually made by a drawing process, and is not machined. Hence, at low pressures, there may be gaps between the float surface 7 and the lower surface 55 of the seat 50 causing leakage at low pressures. By introducing a bead 56 on the lower surface 55, increased contact pressure will cause the seat 50 to readily conform to the flat surface 7 of the float 2 and provide a tight seal at low pressures.

The bead 56 is of a higher profile than the bead 44 in FIG. 5 because the bead 56 is not secured against any surface during assembly. A relatively high profile (1/32") is used to maximize the benefit of the bead 56 for low pressure sealing. The addition of the bead groove 52 enables the seat material to be molded in a high durometer material for high pressure applications or applications where pressure surges may occur.

Figure 3:
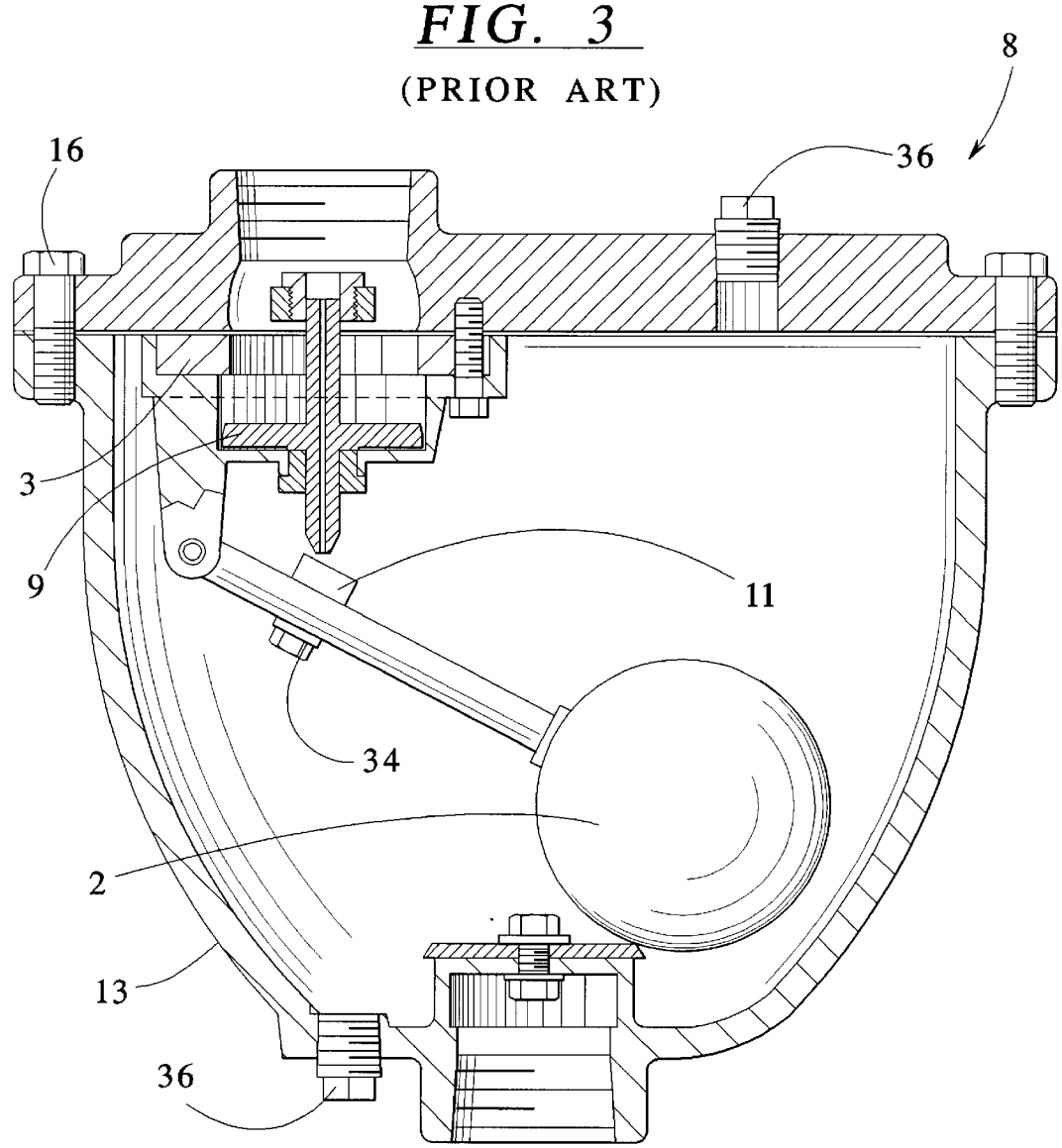

A third embodiment of an improved seat 60 is illustrated in FIG. 7. This embodiment may be advantageously used in the combination air release and air/vacuum valve shown in FIG. 3 of the prior art.

As shown in FIG. 7, the cover sealing surface 42B has been enhanced with the addition of a low profile bead 62 in the elastomeric material. The bead 62 produces a narrow sealing surface 64 which magnifies the surface pressure between the seat 60 and the cover 14. This high contact pressure causes the elastomer to fill in any irregularities in the metal surface of the cover 14 and provide a seal at pressures down to zero. The low profile bead 62 is necessary to prevent any distortion of the seat opening when it is bolted down by the baffle 22.

The top flat surface 63 of the plug 9 seals against a lower surface 66 of the seat 60. It is important to limit the deflection of the elastomeric seat 60 when the valve 8 is under high pressure. If the deflection is high, the plug 9 may become disengaged from the orifice button 11 shown in FIG. 3 and leak line fluid. The bead 62 allows the use of a high durometer seat 60 which will minimize the deflection of the seat 60. A bead 68 is also provided on the lower surface 66 of the seat 60. The bead 68 on the lower surface 66 increases contact pressure and causes the seat 60 to readily conform to the surface of the plug 9 to provide a seal at low pressures. The addition of the top bead 62 and bottom bead 68 enable the valve 8 to operate effectively from near zero to 300 psi and in applications where pressure surges may occur.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An air valve comprising:
   a resilient member having a top surface and a bottom surface and a through hole therebetween, said through hole having a peripheral edge;

a circular raised bead positioned on said bottom surface, said circular raised bead having a diameter larger than that of said through hole, such that a lateral expanse of said bottom surface exists between said peripheral edge of said through hole and said circular raised bead;

a notch formed in said top surface circumscribing said through hole and having a diameter larger than that of said through hole so that said notch forms a sealing contact surface on said top surface at said peripheral edge of said through hole; and a float having a valve surface arranged to compress said circular raised bead said valve surface closing said through hole and sealing against said raised bead.

2. The seal of claim 1, further comprising:

at least two further through holes formed in said resilient member and positioned outside of said circular raised bead.

3. The seal of claim 1, wherein said resilient member is formed of an elastomer.

4. The seal of claim 1, wherein said circular raised bead has an approximate height of $1/32$".

5. The seal of claim 1, wherein said resilient member is formed of a hard elastomer.

6. The seal of claim 1, wherein said resilient member is formed of Buna-N.

7. The air valve according to claim 1, wherein said valve surface is spherical.

8. The air valve according to claim 1 wherein said valve surface is substantially flat.

9. An air valve, comprising:

a resilient member having a top surface and a bottom surface and a through hole therebetween;

only one top circular raised bead having a cross-sectional area positioned on said top surface, said top circular raised bead having a diameter larger than that of said through hole;

only one bottom circular raised bead having a cross-sectional area positioned on said bottom surface, said bottom circular raised bead having a diameter larger than that of said through hole, wherein the cross-sectional area of said bottom circular raised bead is larger than the cross-sectional area of said top circular raised bead and further wherein the diameter of said top circular raised bead is greater than the diameter of said bottom circular raised bead; and a float having a valve surface connected thereto arranged to compress said bottom circular raised bead, said valve surface closing said through hole and sealing against said raised bead.

10. The seal of claim 9 wherein said circular raised bead positioned on said bottom surface has an approximate height of $1/32$" and said circular raised bead on said top surface has an approximate height of $1/64$".

11. The seal of claim 9, further comprising:

at least two further through holes formed in said resilient member and positioned outside of said top circular raised bead.

12. The seal of claim 9, wherein said circular raised bead has an approximate height of $1/64$".

13. The seal of claim 9, wherein said resilient member is formed of a hard elastomer of up to approximately 90 durometer.

14. The seal of claim 9, wherein said resilient member is formed of an elastomer.

15. The air valve according to claim 9 wherein said valve surface is substantially flat.

16. The air valve according to claim 9, wherein said valve surface is spherical.

17. The seal of claim 9, wherein said resilient member is formed of Buna-N.

* * * * *